(12) United States Patent
Nakamura et al.

(10) Patent No.: US 12,249,943 B2
(45) Date of Patent: Mar. 11, 2025

(54) CONTROL DEVICE

(71) Applicant: Hitachi Astemo, Ltd., Hitachinaka (JP)

(72) Inventors: Yuta Nakamura, Utsunomiya (JP);
Masatoshi Goto, Shimotsuke (JP);
Yoshinori Sagiya, Shimotsuke (JP);
Kazunari Kurokawa, Oyama (JP);
Shugo Ueno, Utsunomiya (JP);
Shintaro Tai, Utsunomiya (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/540,595

(22) Filed: Dec. 2, 2021

(65) Prior Publication Data
US 2022/0182006 A1    Jun. 9, 2022

(30) Foreign Application Priority Data
Dec. 4, 2020    (JP) ................. 2020-201949

(51) Int. Cl.
*H02P 27/06*    (2006.01)
*H02M 1/32*    (2007.01)
(Continued)

(52) U.S. Cl.
CPC .......... *H02P 29/028* (2013.01); *H02M 1/325* (2021.05); *H02P 27/06* (2013.01); *H02P 29/027* (2013.01); *H02M 1/327* (2021.05); *H02P 29/68* (2016.02)

(58) Field of Classification Search
CPC ...... H02P 29/028; H02P 27/06; H02P 29/027; H02P 29/68; H02M 1/327; H02M 1/325
See application file for complete search history.

(56) References Cited

U.S. PATENT DOCUMENTS

| 5,375,028 A | 12/1994 | Fukunaga |
| 8,410,745 B2 * | 4/2013 | Hosoda ................. B60L 3/04 363/40 |

(Continued)

FOREIGN PATENT DOCUMENTS

| JP | H05207766 A | 8/1993 |
| JP | 4757815 B2 | 6/2011 |
| JP | 2017184077 A | 10/2017 |

OTHER PUBLICATIONS

JPO Notice of Reasons for Refusal issued in corresponding JP Application No. 2020-201949; dated Jan. 30, 2024; 8 pages.

*Primary Examiner* — Rina I Duda
(74) *Attorney, Agent, or Firm* — CANTOR COLBURN LLP

(57) ABSTRACT

A control device that does not require arithmetic processing of a phase current can be provided. A control device in which a plurality of switching legs including a pair of semiconductor switching elements constituting an upper arm and a lower arm are provided in a number corresponding to the number of phases of a motor that is a load includes a switch short circuit detection unit configured to detect a short circuit failure of the semiconductor switching element, and a control unit configured to execute determination processing of determining whether the short circuit failure has occurred in the upper arm or the lower arm on the basis of a result of detection by the switch short circuit detection unit, and to set all the semiconductor switching elements that constitute an arm in which a short circuit failure has occurred on the basis of a result of the determination processing.

14 Claims, 4 Drawing Sheets

(51) Int. Cl.
*H02P 29/024* (2016.01)
*H02P 29/028* (2016.01)
*H02P 29/68* (2016.01)

(56) References Cited

U.S. PATENT DOCUMENTS

| | | | | |
|---|---|---|---|---|
| 8,773,054 | B2 * | 7/2014 | Goto | B60W 10/08 |
| | | | | 318/400.26 |
| 8,779,706 | B2 * | 7/2014 | Tsuji | B60L 3/003 |
| | | | | 318/434 |
| 8,872,455 | B2 * | 10/2014 | Tremel | H02P 29/0241 |
| | | | | 318/504 |
| 10,180,459 | B2 * | 1/2019 | Mizoguchi | G01R 31/3278 |
| 2012/0013182 | A1 * | 1/2012 | Minegishi | B60L 50/61 |
| | | | | 307/9.1 |
| 2013/0221781 | A1 * | 8/2013 | Nakayama | H02K 1/185 |
| | | | | 310/89 |
| 2016/0164402 | A1 * | 6/2016 | Hargis | H02M 3/07 |
| | | | | 327/536 |

* cited by examiner

CONTROL DEVICE

CROSS REFERENCE TO RELATED APPLICATIONS

The present invention claims priority under 35 U.S.C. § 119 to Japanese Application No. 2020-201949 filed Dec. 4, 2020, the entire content of which is incorporated herein by reference.

BACKGROUND OF THE INVENTION

Field of the Invention

The present invention relates to a control device

Description of Related Art

Patent Literature 1 described below discloses a control device for a motor. This control device drives a motor, and at the same time, when it detects a short circuit failure of a switch part in an inverter circuit consisting of a plurality of switch parts while the motor is driven, determines whether the switch part where the short circuit failure has occurred is on the positive electrode side or the negative electrode side. The control device performs three-phase short circuit control on the basis of the determination.

In this control device, among switch parts on the positive electrode side and switch parts on the negative electrode side, all the switch parts where a short circuit failure has occurred are set to be in an ON state. As a result, the control device suppresses the concentration of current in a switch part that has a short circuit failure, and distributes the current to the switch parts where a short circuit failure has occurred. This distribution of current prevents abnormal heat generation of the switch part that has a short circuit failure.

PATENT DOCUMENTS

[Patent Document 1] Japanese Patent No. 4757815

SUMMARY OF THE INVENTION

The control device described above takes currents (phase currents) of each phase into an electronic control unit (ECU) and performs arithmetic processing to determine whether a switch part in which a short circuit failure has occurred is an upper arm or a lower arm. The upper arm is a switch part on a positive electrode side. The lower arm is a switch part on a negative electrode side. Since the determination processing is performed by the arithmetic processing of phase currents in the ECU which is a control device, a time lag until the execution of three-phase short circuit control may become large in some cases.

Since the ECU performs the arithmetic processing of phase currents according to software processing based on a control program, it may not be possible to promptly start the arithmetic processing of phase currents depending on an execution status of other arithmetic processing. For this reason, it is not possible to stabilize a start timing of the arithmetic processing of phase currents.

The present invention has been made in view of the circumstances described above, and an object thereof is to provide a control device that does not require arithmetic processing of a phase current.

In order to achieve the object described above, in the present invention, a device adopted as a first resolution device relating to a control device is a control device in which a plurality of switching legs including a pair of semiconductor switching elements constituting an upper arm and a lower arm are provided in a number corresponding to the number of phases of a motor that is a load, and includes a switch short circuit detection unit configured to detect a short circuit failure of the semiconductor switching element, and a control unit configured to execute determination processing of determining whether the short circuit failure has occurred in the upper arm or the lower arm on the basis of a result of detection by the switch short circuit detection unit, and to set all the semiconductor switching elements that constitute an arm in which the short circuit failure has occurred on the basis of a result of the determination processing to be in an ON state.

In a device adopted as a second resolution device relating to a control device of the present invention, the switch short circuit detection unit is provided for each semiconductor switching element and detects short circuit failures of the semiconductor switching elements corresponding thereto and other semiconductor switching elements constituting the switching leg in the first resolution device described above.

In a device adopted as a third resolution device relating to a control device of the present invention, the control unit executes the determination processing while the motor is controlled, and sets all the semiconductor switching elements constituting an arm in which the short circuit failure has occurred on the basis of a result of the determination processing to be in an ON state in the first or second resolution device described above.

In a device adopted as a fourth resolution device relating to a control device of the present invention, when all the semiconductor switching elements are already set to be in an ON state, the control unit determines whether an elapsed time since all the elements were set to be in the ON state is within a predetermined time threshold value, determines whether an arm whose semiconductor switching elements are all set to be in the ON state matches a result of the determination processing when the elapsed time is within the time threshold value, and switches the arm whose semiconductor switching elements are all set to be in the ON state when the arm does not match the result of the determination processing in any one of the first to third resolution devices described above.

In a device adopted as a fifth resolution device relating to a control device of the present invention, detection results of the short circuit failure in each phase are aggregated into one signal each for an upper arm and a lower arm and supplied to the control unit in any one of the first to fourth resolution devices described above.

In a device adopted as a sixth resolution device relating to a control device of the present invention, the semiconductor switching element includes a monitor terminal of an output current, and the switch short circuit detection unit detects the short circuit failure on the basis of the output current input from the monitor terminal in any one of the first to fifth resolution devices described above.

According to the present invention, it is possible to provide a control device that does not require arithmetic processing of a phase current.

DETAILED DESCRIPTION OF THE INVENTION

Hereinafter, an embodiment of the present invention will be described with reference to the drawings.

Figure 1:
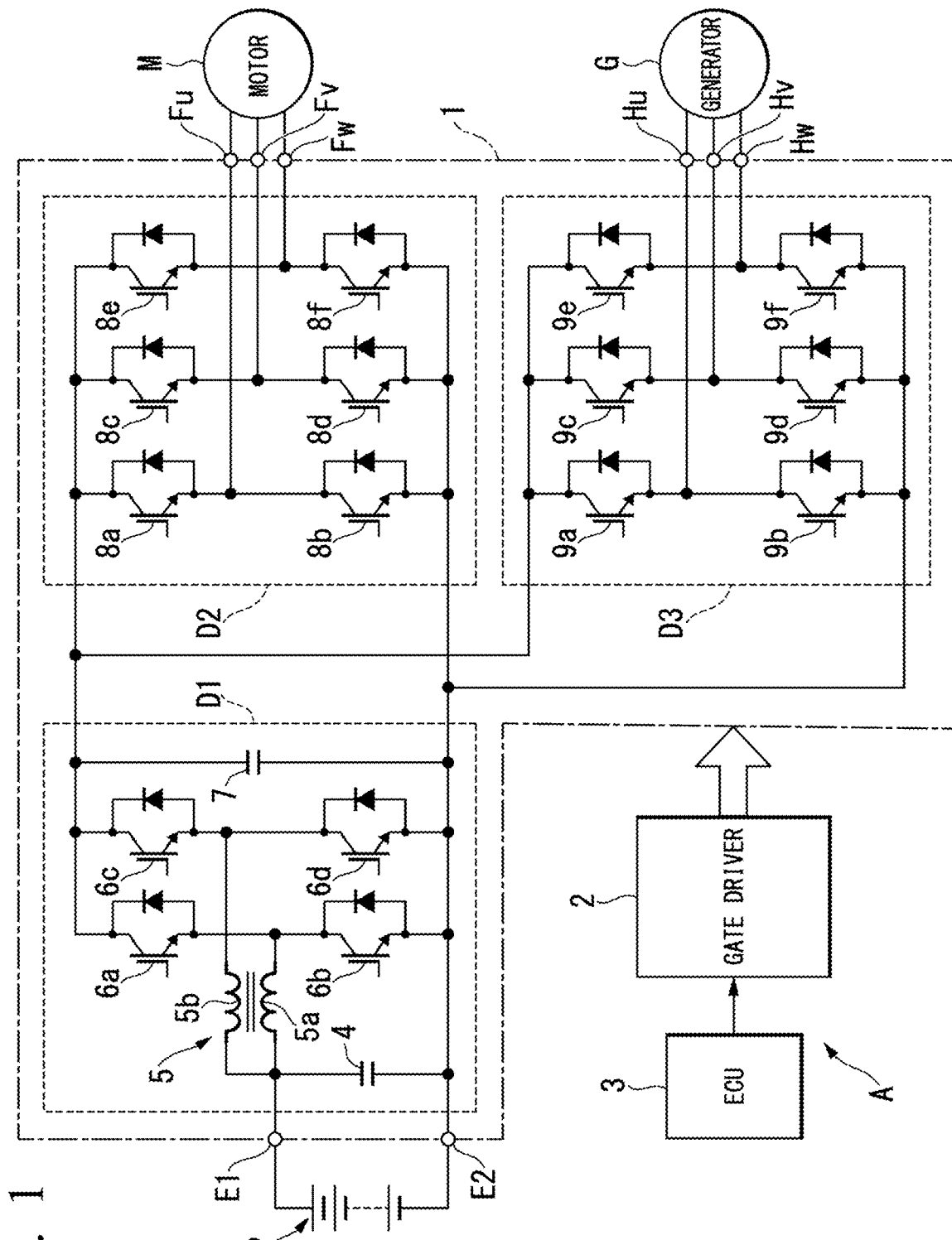
FIG. 1 is a circuit diagram which shows an overall configuration of a control device A according to an embodiment of the present invention.

As shown in FIG. 1, a control device A according to the present embodiment includes a power control unit (PCU) 1, a gate driver 2, and an electronic control unit (ECU) 3. The PCU 1 includes three power conversion circuits as shown in FIG. 1. In the present embodiment, the PCU 1 includes a step-up/down converter D1, a first inverter D2, and a second inverter D3. The gate driver 2 and the ECU 3, which are components of the control device A, constitute a control unit of the present invention.

The step-up/down converter D1 includes a first capacitor 4, a transformer 5, four transformer insulated gate bipolar transistors (IGBTs) 6a to 6d, and a second capacitor 7. The first inverter D2 includes six driving IGBTs 8a to 8f. The second inverter D3 includes six power generation IGBTs 9a to 9f.

A battery P, a three-phase motor M (motor), and a generator G are connected to each other in the control device A as shown in FIG. 1. The control device A includes battery terminals E1 and E2, three motor terminals Fu, Fv, and Fw, and three generator terminals Hu, Hv, and Hw as terminals for external connection. The battery terminals E1 and E2 are a pair of terminals to which the battery P is connected. The three-phase motor M is connected to the three motor terminals Fu, Fv, and Fw. The generator G is connected to the battery terminals E1 and E2.

The control device A is an electric device provided in an electrically driven vehicle such as a hybrid vehicle or an electric vehicle. The control device A controls the three-phase motor M, which is a rotary electric machine, and also controls charging of the battery P with AC power generated by the generator G. The control device A performs drive control of the three-phase motor M and charge control of the battery P.

In the battery P, the positive electrode is connected to the battery terminal E1 and the negative electrode is connected to the battery terminal E2. The battery P is a secondary battery such as a lithium-ion battery. The battery P performs discharging of DC power from the control device A and charging of DC power via the control device A.

The three-phase motor M is a three-phase motor whose number of phases is "3" and is a load of the first inverter D2. For the three-phase motor M, a U-phase input terminal is connected to a U-phase motor terminal Fu, a V-phase input terminal is connected to a V-phase motor terminal Fv, and a W-phase input terminal is connected to a W-phase motor terminal Fw. In the three-phase motor M, a rotation shaft (a drive shaft) is connected to wheels of an electrically driven vehicle, and the wheels are rotationally driven by applying rotational power to the wheels.

The generator G is a three-phase generator. In the generator G, a U-phase output terminal is connected to a U-phase generator terminal Hu, a V-phase output terminal is connected to a V-phase generator terminal Hv, and a W-phase output terminal is connected to a W-phase generator terminal Hw. The generator G is connected to an output shaft of a power source such as an engine mounted in an electrically driven vehicle, and outputs three-phase AC power to the control device A.

The step-up/down converter D1 is a power conversion circuit that selectively performs a step-up operation of stepping up DC power input from the battery P via a pair of battery terminals E1 and E2 and outputting it to the first inverter D2, and a step-down operation of stepping down DC power input from the first inverter D2 or the second inverter D3 and outputting it to the battery P via the pair of battery terminals E1 and E2. The step-up/down converter D1 is a power circuit that inputs and outputs DC power in both directions between the battery P and the first inverter D2 or the second inverter D3.

The first inverter D2 includes a plurality of switching legs. The number of switching legs corresponds to the number of phases of the three-phase motor M (motor). The first inverter D2 includes three switching legs, including a U-phase driving switching leg, a V-phase driving switching leg, and a W-phase driving switching leg. The first inverter D2 is a power conversion circuit that selectively performs a power-run operation and a regenerative operation.

The first inverter D2 converts the DC power input from the step-up/down converter D1 into three-phase AC power. The first inverter D2 selectively performs a power-run operation of outputting three-phase AC power to the three-phase motor M via the three motor terminals Fu, Fv, and Fw, and a regenerative operation of converting the three-phase AC power input from the three-phase motor M via the three motor terminals Fu, Fv, and Fw into DC power and outputting it to the step-up/down converter D1. The first inverter D2 is a power circuit that mutually converts DC power and three-phase AC power between the step-up/down converter D1 and the three-phase motor M.

The second inverter D3 converts the three-phase AC power input from the generator G to DC power via the three generator terminals Hu, Hv, and Hw. The second inverter D3 is a power conversion circuit that outputs the converted DC power to the step-up/down converter D1. The second inverter D3 is a power circuit that converts three-phase AC power to DC power from the generator G toward the step-up/down converter D1.

A configuration of the step-up/down converter D1 will be described. One end of the first capacitor 4 is connected to the first input/output terminal E1 and the transformer 5, and the other end is connected to the second input/output terminal E2. Both ends of the first capacitor 4 are input/output terminals on a primary side in the step-up/down converter D1.

The first capacitor 4 is connected in parallel to the battery P. The first capacitor 4 removes high frequency noise that can be included in DC power (battery power) input from the battery P to the step-up/down converter IN. The first capacitor 4 smooths ripples that can be included in DC power (charging power) input from the transformer 5.

The transformer 5 includes a primary winding 5a and a secondary winding 5b. In the transformer 5, one end of the primary winding 5a and one end of the secondary winding 5b are connected to one end of the first input/output terminal E1 and the first capacitor 4. The other end of the primary winding 5a is connected to an emitter terminal of a first transformer IGBT 6a and a collector terminal of a second transformer IGBT 6b. The other end of the secondary winding 5b is connected to an emitter terminal of a third transformer IGBT 6c and a collector terminal of a fourth transformer IGBT 6d.

In the transformer 5, the primary winding 5a and the secondary winding 5b are electromagnetically coupled using a predetermined coupling coefficient k. The primary winding 5a has a predetermined first self-inductance La according to the number of windings thereof or the like. The secondary winding 5b has a predetermined second self-inductance Lb according to the number of windings thereof or the like. The primary winding 5a and the secondary winding 5b have the first self-inductance La, the second self-inductance Lb, and a mutual inductance M based on the coupling coefficient k described above.

Among the four transformer IGBTs 6a to 6d, the first transformer IGBT 6a and the second transformer IGBT 6b constitute a first switching leg in the step-up/down converter D1. Among the first transformer IGBT 6a and the second transformer IGBT 6b, the first transformer IGBT 6a constitutes an upper arm of the first switching leg.

In the first transformer IGBT 6a, the collector terminal is commonly connected to a collector terminal of the third transformer IGBT 6c and one end of the second capacitor 7, the emitter terminal is commonly connected to the other end of the primary winding 5a and a collector terminal of the second transformer IGBT 6b, and the gate terminal is connected to the first output terminal for the step-up/down converter D1 in the gate driver 2. Such a first transformer IGBT 6a is a semiconductor switching element whose ON/OFF operations are controlled on the basis of a first transformer gate signal input from the gate driver 2.

The second transformer IGBT 6b constitutes a lower arm of the first switching leg. The collector terminal of the second transformer IGBT 6b is commonly connected to the other end of the primary winding 5a and the emitter terminal of the first transformer IGBT 6a. The emitter terminal of the second transformer IGBT 6b is commonly connected to the emitter terminal of the fourth transformer IGBT 6d, the other end of the first capacitor 4, and the other end of the second capacitor 7.

The gate terminal of the second transformer IGBT 6b is connected to the second output terminal for the step-up/down converter D1 in the gate driver 2. The second transformer IGBT 6b is a semiconductor switching element whose ON/OFF operations are controlled on the basis of a second transformer gate signal input from the gate driver 2.

Among the four transformer IGBTs 6a to 6d, the third transformer IGBT 6c and the fourth transformer IGBT 6d constitute the second switching leg in the step-up/down converter D1. Among the third transformer IGBT 6c and the fourth transformer IGBT 6d, the third transformer IGBT 6c constitutes an upper arm of the second switching leg.

In the third transformer IGBT 6c, the collector terminal is commonly connected to the collector terminal of the first transformer IGBT 6a and one end of the second capacitor 7, the emitter terminal is commonly connected to the other end of the secondary winding 5b and the collector terminal of the fourth transformer IGBT 6d, and the gate terminal is connected to a third output terminal for the step-up/down converter D1 in the gate driver 2. The third transformer IGBT 6c is a semiconductor switching element whose ON/OFF operations are controlled on the basis of a third transformer gate signal input from the gate driver 2.

The fourth transformer IGBT 6d constitutes a lower arm of the second switching leg. In the fourth transformer IGBT 6d, the collector terminal is commonly connected to the other end of the secondary winding 5b and the emitter terminal of the third transformer IGBT 6c, and the emitter terminal is commonly connected to the emitter terminal of the first transformer IGBT 6a, the other end of the first capacitor 4, and the other end of the second capacitor 7.

The gate terminal of the fourth transformer IGBT 6d is connected to the fourth output terminal for the step-up/down converter D1 in the gate driver 2. The fourth transformer IGBT 6d is a semiconductor switching element whose ON/OFF operations are controlled on the basis of a fourth transformer gate signal input from the gate driver 2.

One end of the second capacitor 7 is connected to the collector terminal of the first transformer IGBT 6a and the collector terminal of the third transformer IGBT 6c. The other end of the second capacitor 7 is commonly connected to the emitter terminal of the second transformer IGBT 6b, the emitter terminal of the fourth transformer IGBT 6d, the other end of the first capacitor 4, and a second DC input/output terminal E2. Both ends of the second capacitor 7 are input/output terminals on a secondary side of the step-up/down converter D1.

The second capacitor 7 smooths the ripples that can be included in the DC power (boosting power) input from the first switching leg and the second switching leg. The second capacitor 7 smooths ripples that can be included in DC power (regenerative power) input from the first inverter D2 and ripples that can be included in DC power (charging power) input from the second inverter D3.

Among the six driving IGBTs 8a to 8f constituting the first inverter D2, a first driving IGBT 8a and a second driving IGBT 8b constitute the U-phase driving switching leg. A third driving IGBT 8c and a fourth driving IGBT 8d constitute the V-phase driving switching leg. A fifth driving IGBT 8e and a sixth driving IGBT 8f constitute the W-phase driving switching leg.

Among the first driving IGBT 8a and the second driving IGBT 8b, the collector terminal of the first driving IGBT 8a is commonly connected to the collector terminal of the third driving IGBT 8c and the collector terminal of the fifth driving IGBT 8e, and the emitter terminal thereof is commonly connected to a collector terminal and a U-phase motor terminal Fu of the second driving IGBT 8b.

The gate terminal of the first driving IGBT 8a is connected to the first output terminal for the first inverter D2 in the gate driver 2. The first driving IGBT 8a is a semiconductor switching element whose ON/OFF operations are controlled on the basis of a first driving gate signal input from the gate driver 2.

The collector terminal of the second driving IGBT 8b is commonly connected to the emitter terminal of the first driving IGBT 8a and the U-phase motor terminal Fu. The emitter terminal of the second driving IGBT 8b is commonly connected to the emitter terminal of the fourth driving IGBT 8d and the emitter terminal of the sixth driving IGBT 8f.

The gate terminal of the second driving IGBT 8b is connected to a second output terminal for the first inverter D2 in the gate driver 2. The second driving IGBT 8b is a semiconductor switching element whose ON/OFF operations are controlled on the basis of a second driving gate signal input from the gate driver 2.

The collector terminal of the third driving IGBT 8c is commonly connected to the collector terminal of the first driving IGBT 8a and the collector terminal of the fifth driving IGBT 8e. The emitter terminal of the third driving IGBT 8c is commonly connected to a collector terminal and a V-phase motor terminal Fv of the fourth driving IGBT 8d.

The gate terminal of the third driving IGBT 8c is connected to the second output terminal for the first inverter D2 in the gate driver 2. The third driving IGBT 8c is a semiconductor switching element whose ON/OFF operations are controlled on the basis of a third driving gate signal input from the gate driver 2.

The collector terminal of the fourth driving IGBT 8d is commonly connected to the emitter terminal and the V-phase motor terminal Fv of the third driving IGBT 8c. The emitter terminal of the fourth driving IGBT 8d is commonly connected to the emitter terminal of the second driving IGBT 8b and the emitter terminal of the sixth driving IGBT 8f.

The gate terminal of the fourth driving IGBT 8d is connected to the fourth output terminal for the first inverter D2 in the gate driver 2. The fourth driving IGBT 8d is a semiconductor switching element whose ON/OFF operations are controlled on the basis of a fourth driving gate signal input from the gate driver 2.

The collector terminal of the fifth driving IGBT 8e is commonly connected to the collector terminal of the first driving IGBT 8a and the collector terminal of the third driving IGBT 8c. The emitter terminal of the fifth driving IGBT 8e is commonly connected to a collector terminal and a W-phase motor terminal Fw of the sixth driving IGBT 8f.

The gate terminal of the fifth driving IGBT 8e is connected to the fifth output terminal for the first inverter D2 in the gate driver 2. The fifth driving IGBT 8e is a semiconductor switching element whose ON/OFF operations are controlled on the basis of a fifth driving gate signal input from the gate driver 2.

The collector terminal of the sixth driving IGBT 8f is commonly connected to the emitter terminal and a W phase motor terminal Fw of the fifth driving IGBT 8e. The emitter terminal of the sixth driving IGBT 8f is commonly connected to the emitter terminal of the second driving IGBT 8b and the emitter terminal of the fourth driving IGBT 8d.

The gate terminal of the sixth driving IGBT 8f is connected to the sixth output terminal for the first inverter D2 in the gate driver 2. The sixth driving IGBT 8f is a semiconductor switching element whose ON/OFF operations are controlled on the basis of a sixth driving gate signal input from the gate driver 2.

Both ends of the U-phase driving switching leg, the V-phase driving switching leg, and the W-phase driving switching leg, which are three switching legs commonly connected to each other in the first inverter D2, are input/output terminals of the first inverter D2 on the primary side.

A midpoint of the U-phase driving switching leg is a connection point between the emitter terminal of the first driving IGBT 8a and the collector terminal of the second driving IGBT 8b. A midpoint of the V-phase driving switching leg is a connection point between the emitter terminal of the third driving IGBT 8c and the collector terminal of the fourth driving IGBT 8d. A midpoint of the W-phase driving switching leg is a connection point between the emitter terminal of the fifth driving IGBT 8e and the collector terminal of the sixth driving IGBT 8f. The midpoints of these three legs are input/output terminals of the first inverter D2 on a secondary side.

One of the input/output terminals of the first inverter D2 on a primary side is the collector terminal of the first driving IGBT 8a, the collector terminal of the third driving IGBT 8c, and the collector terminal of the fifth driving IGBT 8e. One of the input/output terminals on a secondary side in the step-up/down converter D1 is one end of the second capacitor 7, the collector terminal of the first transformer IGBT 6a, and the collector terminal of the third transformer IGBT 6c. One of the input/output terminals of the first inverter D2 on a primary side is connected to one of the input/output terminals on a secondary side in the step-up/down converter D1.

The other of the input/output terminals of the first inverter D2 on a primary side is the emitter terminal of the second driving IGBT 8b, the emitter terminal of the fourth driving IGBT 8d, and the emitter terminal of the sixth driving IGBT 8f. The other of the input/output terminals on a secondary side in the step-up/down converter D1 is the other end of the first capacitor 4, the other end of the second capacitor 7, the emitter terminal of the second transformer IGBT 6b, and the emitter terminal of the fourth transformer IGBT 6d. The other of the first inverter D2 on a primary side is connected to the other of the input/output terminals on a secondary side in the step-up/down converter D1.

Among the six power generation IGBTs 9a to 9f constituting the second inverter D3, a first power generation IGBT 9a and a second power generation IGBT 9b constitute a U-phase power generation switching leg. A third power generation IGBT 9c and a fourth power generation IGBT 9d constitute a V-phase power generation switching leg. A fifth power generation IGBT 9e and a sixth power generation IGBT 9f constitute a W-phase power generation switching leg.

A collector terminal of the first power generation IGBT 9a is commonly connected to a collector terminal of the third power generation IGBT 9c and a collector terminal of the fifth power generation IGBT 9e. The emitter terminal of the first power generation IGBT 9a is commonly connected to a collector terminal and a U-phase generator terminal Hu of the second power generation IGBT 9b.

A gate terminal of this first power generation IGBT 9a is connected to a first output terminal for the second inverter D3 in the gate driver 2. The first power generation IGBT 9a is a semiconductor switching element whose ON/OFF operations are controlled on the basis of a first power generation gate signal input from the gate driver 2.

The collector terminal of the second power generation IGBT 9b is commonly connected to the emitter terminal and the U-phase generator terminal Hu of the first power generation IGBT 9a. The emitter terminal of the second power generation IGBT 9b is commonly connected to the emitter terminal of the fourth power generation IGBT 9d and the emitter terminal of the sixth power generation IGBT 9f.

A gate terminal of the second power generation IGBT 9b is connected to a second output terminal for the second inverter D3 in the gate driver 2. The second power generation IGBT 9b is a semiconductor switching element whose ON/OFF operations are controlled on the basis of a second power generation gate signal input from the gate driver 2.

The collector terminal of the third power generation IGBT 9c is commonly connected to the collector terminal of the first power generation IGBT 9a and the collector terminal of the fifth power generation IGBT 9e. The emitter terminal of the third power generation IGBT 9c is commonly connected to a collector terminal and a V-phase generator terminal Hv of the fourth power generation IGBT 9d.

A gate terminal of the third power generation IGBT 9c is connected to the second output terminal for the second inverter D3 in the gate driver 2. The third power generation IGBT 9c is a semiconductor switching element whose ON/OFF operations are controlled on the basis of a third power generation gate signal input from the gate driver 2.

A collector terminal of the fourth power generation IGBT 9d is commonly connected to the emitter terminal and a V-phase generator terminal Hv of the third power generation IGBT 9c. The emitter terminal of the fourth power generation IGBT 9d is commonly connected to the emitter terminal of the second power generation IGBT 9b and the emitter terminal of the sixth power generation IGBT 9f.

A gate terminal of the fourth power generation IGBT 9d is connected to a fourth output terminal for the second inverter D3 in the gate driver 2. The fourth power generation IGBT 9d is a semiconductor switching element whose ON/OFF operations are controlled on the basis of a fourth power generation gate signal input from the gate driver 2.

A collector terminal of the fifth power generation IGBT 9e is commonly connected to the collector terminal of the first power generation IGBT 9a and the collector terminal of the third power generation IGBT 9c. An emitter terminal of the fifth power generation IGBT 9e is commonly connected to a collector terminal and a W-phase generator terminal Hw of the sixth power generation IGBT 9f.

A gate terminal of the fifth power generation IGBT 9e is connected to a fifth output terminal for the second inverter D3 in the gate driver 2. The fifth power generation IGBT 9e is a semiconductor switching element whose ON/OFF operations are controlled on the basis of a fifth power generation gate signal input from the gate driver 2.

A collector terminal of the sixth power generation IGBT 9f is commonly connected to the emitter terminal and a W-phase generator terminal Hw of the fifth power generation IGBT 9e. The emitter terminal of the sixth power generation IGBT 9f is commonly connected to the emitter terminal of the second power generation IGBT 9b and the emitter terminal of the fourth power generation IGBT 9d.

A gate terminal of the sixth power generation IGBT 9f is connected to a sixth output terminal for the second inverter D3 in the gate driver 2. Such a sixth power generation IGBT 9f is a semiconductor switching element whose ON/OFF operations are controlled on the basis of a sixth power generation gate signal input from the gate driver 2.

A midpoint of the U-phase power generation switching leg is a connection point between the emitter terminal of the first power generation IGBT 9a and the collector terminal of the second power generation IGBT 9b. A midpoint of the V-phase power generation switching leg is a connection point between the emitter terminal of the third power generation IGBT 9c and the collector terminal of the fourth power generation IGBT 9d. A midpoint of the W-phase power generation switching leg is a connection point between the emitter terminal of the fifth power generation IGBT 9e and the collector terminal of the sixth power generation IGBT 9f. The midpoint of the U-phase power generation switching leg, the midpoint of the V-phase power generation switching leg, and the midpoint of the W-phase power generation switching leg are the input/output terminals of the second inverter D3 on a primary side.

Among the three input/output terminals on a primary side in the second inverter D3, the midpoint of the U-phase power generation switching leg is connected to the U-phase generator terminal Hu, and the midpoint of the V-phase generator terminal Hv is connected to the V-phase generator terminal Hv, and the midpoint of the W-phase generator terminal Hw is connected to the W-phase generator terminal Hw.

Both ends of each of the U-phase power generation switching leg, the V-phase power generation switching leg, and the W-phase power generation switching leg, which are commonly connected to each other in the second inverter D3, are input/output terminals on a secondary side in the second inverter D3. The input/output terminals on the secondary side in the second inverter D3 are the collector terminal of the first power generation IGBT 9a, the collector terminal of the third power generation IGBT 9c, the collector terminal of the fifth power generation IGBT 9e, and the emitter terminal of the second power generation IGBT 9b, the emitter terminal of the fourth power generation IGBT 9d, and the emitter terminal of the sixth power generation IGBT 9f.

The input/output terminal of the second inverter D3 on the secondary side is commonly connected to the input/output terminal of the step-up/down converter D1 on the secondary side and the input/output terminal of the first inverter D2 on the primary side. The step-up/down converter D1 may mutually perform input/output of DC power between the battery P and the first inverter D2 and the second inverter D3. The step-up/down converter D1 may mutually perform input/output of DC power between the battery P and the first inverter D2 or the second inverter D3.

The transformer IGBTs 6a to 6d, the driving IGBTs 8a to 8f, and the power generation IGBTs 9a to 9f described above each include a freewheel diode as shown in FIG. 1. For each IGBT, this freewheel diode has a cathode terminal connected to the collector terminal and an anode terminal connected to the emitter terminal. The freewheel diode can allow a freewheel current to flow from the anode terminal to the cathode terminal when the IGBT is in an OFF state.

The gate driver 2 is a pulse circuit that generates a first to a fourth transformer gate signal, a first to a sixth driving gate signal, and a first to a sixth power generation gate signal on the basis of a voltage control command value input from the ECU 3. The gate driver 2 generates, for example, a pulse width modulation (PWM) signal having a duty ratio corresponding to the voltage control command value as the first to the fourth transformer gate signals, the first to the sixth driving gate signals, and the first to the sixth power generation gate signals by comparing a carrier wave having a predetermined cycle with the voltage control command value. The carrier wave is, for example, a triangular wave.

The ECU 3 performs driving control of the three-phase motor M and charging control of the battery P via the PCU 1 and the gate driver 2. The ECU 3 generates a plurality of voltage control command values required to control the step-up/down converter D1, the first inverter D2, and the second inverter D3 on the basis of a detection value of a voltage sensor (a voltage detection value) and a detection value of a current sensor (a current detection value), operation information of an electrically driven vehicle, and the like which are provided incidentally in the step-up/down converter D1, the first inverter D2, and the second inverter D3.

The ECU 3 generate the first to fourth transformer gate signals, the first to sixth driving gate signals, and the first to sixth power generation gate signals by supplying the voltage control command values to the gate driver 2. The step-up/down converter D1 is controlled by the first to the fourth transformer gate signals, the first inverter D2 is controlled by the first to the sixth driving gate signals, and the second inverter D3 is controlled by the first to the sixth power generation gate signals.

Figure 2:
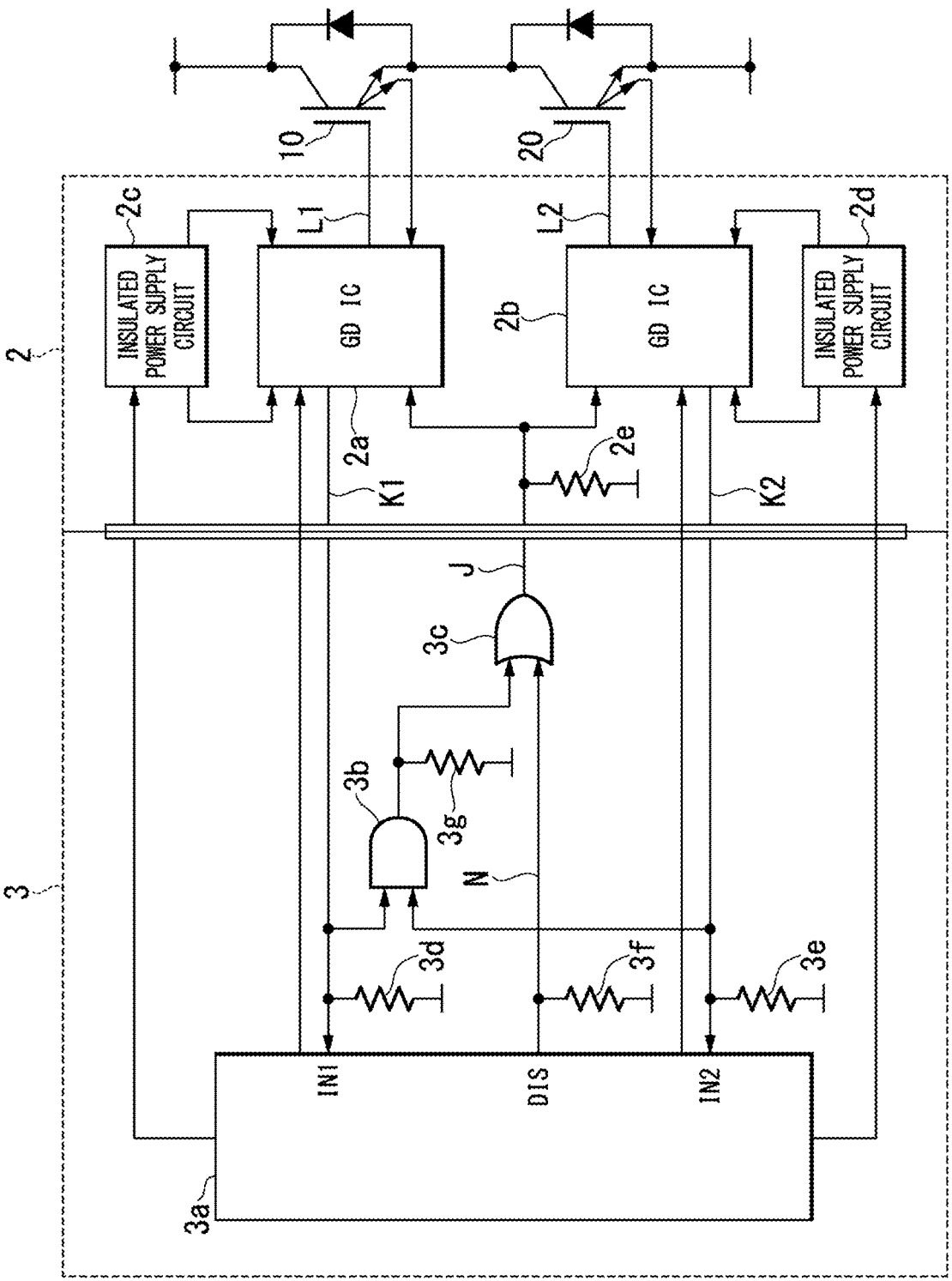
FIG. 2 is a circuit diagram which shows a main configuration of the control device A according to the embodiment of the present invention.

An overall configuration of the control device A according to the present embodiment has been described above with reference to FIG. 1, but this control device A has a characteristic configuration shown in FIG. 2.

FIG. 2 shows an example of a detailed configuration of the gate driver 2 and the ECU 3 relating to one of the three switching legs constituting the first inverter D2, that is, the U-phase driving switching leg, the V-phase driving switching leg, and the W-phase driving switching leg. The control device A according to the present embodiment has the detailed configuration shown in FIG. 2 for all of the three switching legs.

In FIG. 2, a reference numeral 10 is assigned to an IGBT (an IGBT for an upper arm) constituting an upper arm and a reference numeral 20 is assigned to an IGBT (an IGBT for a lower arm) constituting a lower arm in one switching leg. An upper arm IGBT 10 corresponds to any one of the first driving IGBT 8a, the third driving IGBT 8c, and the fifth driving IGBT 8e of the first inverter D2 described above. A lower arm IGBT 20 corresponds to any one of the second driving IGBT 8b, the fourth driving IGBT 8d, and the sixth driving IGBT 8f of the first inverter D2.

The upper arm IGBT 10 and the lower arm IGBT 20 are provided with a monitor terminal (a sense emitter terminal) for monitoring an output current (an emitter current) as shown in FIG. 2. The first to the sixth driving IGBTs 8a to 8f are all types of IGBTs provided with a sense emitter terminal.

The gate driver 2 includes a pair of gate driving ICs 2a and 2b, a pair of insulated power supply circuits 2c and 2d, and a pull-down resistor 2e as shown in FIG. 2. The ECU 3 includes a microcomputer 3a, an AND gate circuit 3b, an OR gate circuit 3c, and four pull-down resistors 3d to 3g.

The pair of gate driving ICs 2a and 2b are provided corresponding to the upper arm IGBT 10 and the lower arm IGBT 20. Among the pair of gate driving ICs 2a and 2b, the first gate driving IC 2a is a gate driving circuit corresponding to the upper arm IGBT 10, and includes a primary side circuit connected to the ECU 3 and a secondary side circuit connected to the upper arm IGBT 10. The first gate driving IC 2a generates an upper arm gate signal L1 on the basis of a voltage control command value of the ECU 3, which is received in the primary side circuit, and outputs the upper arm gate signal L1 from the secondary side circuit to the gate terminal of the upper arm IGBT 10.

The first gate driving IC 2a includes a monitor terminal connected to a sense emitter terminal of the upper arm IGBT 10, an input terminal for receiving a gate cutoff signal J of the ECU 3, and an output terminal for outputting a first detection signal K1 to the ECU 3. The first gate driving IC 2a includes a comparison circuit that compares an emitter current (a monitor current) of the first gate driving IC 2a input to the monitor terminal with a predetermined current threshold value Ri. The first gate driving IC 2a outputs the first detection signal K1 as an output signal of the comparison circuit.

The first detection signal K1 is a signal capable of detecting an overcurrent state of the upper arm IGBT 10. The first detection signal K1 is a pulse signal related to presence or absence of a short circuit failure of the lower arm IGBT 20. The first detection signal K1 has, for example, a Hi (high) potential when the lower arm IGBT 20 is normal, and has a Lo (low) potential when the lower arm IGBT 20 is overcurrent (a short circuit failure).

The first gate driving IC 2a corresponding to the upper arm IGBT 10 does not detect a short circuit failure of the upper arm IGBT 10. The first gate driving IC 2a is a switch short circuit detection unit that detects a short circuit failure of the upper arm IGBT 10 corresponding thereto and the lower arm IGBT 20 (another semiconductor switching element) constituting a switching leg.

The first gate driving IC 2a generates an upper arm gate signal L1 that forcibly sets the upper arm IGBT 10 to be in the OFF state when a gate cutoff signal J is input from the ECU 3. When the gate cutoff signal J is input from the ECU 3, the first gate driving IC 2a forcibly sets the upper arm IGBT 10 to be in the OFF state regardless of a voltage control command value.

The second gate driving IC 2b is a gate driving circuit corresponding to the lower arm IGBT 20. The second gate driving IC 2b includes a primary side circuit connected to the ECU 3 and a secondary side circuit connected to the lower arm IGBT 20. The second gate driving IC 2b generates a lower arm gate signal L2 on the basis of a voltage control command value of the ECU 3 received by the primary side circuit. The second gate driving IC 2b outputs the lower arm gate signal L2 from the secondary side circuit to a base terminal of the lower arm IGBT 20.

The second gate driving IC 2b includes a monitor terminal connected to a sense emitter terminal of the lower arm IGBT 20, an input terminal that receives the gate cutoff signal J of the ECU 3, and an output terminal that outputs a second detection signal K2 to the ECU 3. The second gate driving IC 2b includes a comparison circuit that compares an emitter current of the second gate driving IC 2b input to the monitor terminal with a predetermined current threshold value Ri. The second gate driving IC 2b outputs a second detection signal K2 as an output signal of the comparison circuit.

The second detection signal K2 is a signal that can detect an overcurrent state of the lower arm IGBT 20. The second detection signal K2 is a pulse signal related to the presence or absence of a short circuit failure of the upper arm IGBT 10. The second detection signal K2 has, for example, a Hi (high) potential when the upper arm IGBT 10 is normal, and has a Lo (low) potential when the upper arm IGBT 10 is overcurrent (short circuit failure).

The second gate driving IC 2b corresponding to the lower arm IGBT 20 does not detect a short circuit failure of the lower arm IGBT 20. The second gate driving IC 2b is a switch short circuit detection unit that detects a short circuit failure of the lower arm IGBT 20 corresponding thereto and the upper arm IGBT 10 (another semiconductor switching element) constituting a switching leg.

The second gate driving IC 2b generates a lower arm gate signal L2 that forcibly sets the lower arm IGBT 20 to be in an OFF state when the gate cutoff signal J is input from the ECU 3. When a gate cutoff signal J is input from the ECU 3, the second gate driving IC 2b forcibly sets the lower arm IGBT 20 to be in the OFF state regardless of a voltage control command value.

The pair of gate driving ICs 2a and 2b are switch short circuit detection units that detect the short circuit failures of the lower arm IGBT 20 and the upper arm IGBT 10 on the basis of an emitter current (a monitor current) input from the sense emitter terminals of the upper arm IGBT 10 and the lower arm IGBT 20 that are semiconductor switching elements. The pair of gate driving ICs 2a and 2b output the short circuit failures to a microcomputer 3a of the ECU 3 as a first detection signal K1 and a second detection signal K2.

The pair of gate driving ICs 2a and 2b are provided for each of the U-phase driving switching leg, the V-phase driving switching leg, and the W-phase driving switching leg as described above. The first detection signal K1 and the second detection signal K2 are present in three phases of a U-phase, a V phase and a W phase, that is, there are three of each, respectively.

The gate driver 2 aggregates detection results of a short circuit failure in each phase into one signal and outputs (supplies) it to the ECU 3. The gate driver 2 outputs the three first detection signals K1 to the ECU 3 as one detection signal, and outputs the three second detection signals K2 to the ECU 3 as one detection signal.

Each of the pair of gate driving ICs 2a and 2b is provided with a control input terminal that receives the voltage control command value described above. The ECU 3 individually generates a first voltage control command value for the first gate driving IC 2a and a second voltage control command value for the second gate driving IC 2b. The ECU 3 outputs the first voltage control command value to the control input terminal of the first gate driving IC 2a, and outputs the second voltage control command value to the control input terminal of the second gate driving IC 2b.

Among the pair of insulated power supply circuits 2c and 2d, the first insulated power supply circuit 2c is a power supply circuit provided corresponding to the first gate driving IC 2a. The first insulated power supply circuit 2c separately supplies a power supply to a primary side circuit and a secondary side circuit of the first gate driving IC 2a. The first insulated power supply circuit 2c generates a primary power supply and a secondary power supply that are insulated from each other. The first insulated power supply circuit 2c supplies the primary power supply to the primary side circuit of the first gate driving IC 2a, and supplies the secondary power supply to the secondary power supply of the first gate driving IC 2a.

The second insulated power supply circuit 2d is a power supply circuit provided corresponding to the second gate driving IC 2b. The second insulated power supply circuit 2d separately supplies a power supply to a primary side circuit and a secondary side circuit of the second gate driving IC 2b. The second insulated power supply circuit 2d generates a primary power supply and a secondary power supply that are insulated from each other. The second insulated power supply circuit 2d supplies the primary power supply to the primary side circuit of the second gate driving IC 2b, and supplies the secondary power supply to the secondary power supply of the second gate driving IC 2b.

The pull-down resistor 2e has a predetermined resistance value. One end of the pull-down resistor 2e is connected to an input terminal that receives the gate cutoff signal J in the first gate driving IC 2a and the second gate driving IC 2b, and the other end is connected to a grounding line (GND). A predetermined current flows from the output terminal of an OR gate circuit 3c of the ECU 3 to the grounding line via the pull-down resistor 2e.

The microcomputer 3a is an electronic component that constitutes a central portion of the ECU 3. The microcomputer 3a generates a first voltage control command value and a second voltage control command value on the basis of a control program stored in advance, each detection value of a voltage sensor and a current sensor described above, operation information input from the outside, and the like. The microcomputer 3a outputs the first voltage control command value to the first gate driving IC 2a and outputs the second voltage control command value to the second gate driving IC 2b.

The microcomputer 3a includes at least an input terminal IN1 that receives the first detection signal K1, an input terminal IN2 that receives the second detection signal K2, and an output terminal DIS that outputs the cutoff control signal N. This cutoff control signal N is a pulse signal that controls operations of the pair of gate driving ICs 2a and 2b, and has a Hi (high) potential when cutoff is disabled or has a Lo (low) potential when cutoff is enabled.

The microcomputer 3a determines whether a short circuit failure has occurred in the upper arm or the lower arm as a short circuit polarity on the basis of the detection results of a short circuit failure in the gate driving ICs 2a and 2b. The detection result of a short circuit failure in the gate driving IC 2a is the first detection signal K1. The detection result of a short circuit failure in the gate driving IC 2b is the second detection signal K2. The microcomputer 3a sets all the semiconductor switching elements constituting an arm in which a short circuit failure has occurred on the basis of a result of the determination described above, that is, a short circuit polarity, to be in an ON state.

The microcomputer 3a does not identify an arm in which a short circuit failure has occurred by itself, but determines a short circuit polarity on the basis of the first detection signal K1 and the second detection signal K2 input from the pair of gate driving ICs 2a and 2b. The microcomputer 3a executes three-phase short circuit control, which is control for setting all the semiconductor switching elements constituting the arm in which a short circuit failure has occurred to be in the ON state on the basis of the determined short circuit polarity.

The AND gate circuit 3b has one input terminal connected to an output terminal of the first gate driving IC 2a and an input terminal IN1 of the microcomputer 3a, and the other input terminal connected to an output terminal of the second gate driving IC 2b and an input terminal IN2 of the microcomputer 3a. An output terminal of the AND gate circuit 3b is connected to the other input terminal of the OR gate circuit 3c.

The AND gate circuit 3b takes a logical product of the first detection signal K1 and the second detection signal K2, and outputs an output signal indicating the logical product to the other input terminal in the OR gate circuit 3c. An output of the AND gate circuit 3b has a Hi (high) potential when both the first detection signal K1 and the second detection signal K2 are normal, and, otherwise, the output has a Lo (low) potential.

The OR gate circuit 3c has one input terminal connected to an output terminal DIS of the microcomputer 3a, and the other input terminal connected to an output terminal of the OR gate circuit 3c. The OR gate circuit 3c has an output terminal commonly connected to an input terminal of the first gate driving IC 2a and an input terminal of the second gate driving IC 2b.

Such an OR gate circuit 3c takes a logical sum of the cutoff control signal N of the microcomputer 3a and an output signal of the AND gate circuit 3b, and outputs the gate cutoff signal J indicating the logical sum to the first gate driving IC 2a and the second gate driving IC 2b. The gate cutoff signal J is a pulse signal that controls a mutual cutoff logic by the first detection signal K1 and the second detection signal K2 in the first gate driving IC 2a and the second gate driving IC 2b.

Among four pull-down resistors 3d to 3g, a first pull-down resistor 3d has a predetermined resistance value. One end of the first pull-down resistor 3d is connected to the output terminal of the first gate driving IC 2a, the input terminal IN1 of the microcomputer 3a, and one input terminal of the AND gate circuit 3b. The other end of the first pull-down resistor 3d is connected to the grounding line (GND). A predetermined current flows from the output terminal of the first gate driving IC 2a to the grounding line via the first pull-down resistor 3d.

A second pull-down resistor 3e has a predetermined resistance value. One end of the second pull-down resistor 3e is connected to the output terminal of the second gate driving IC 2b, the input terminal IN2 of the microcomputer 3a, and the other input terminal of the AND gate circuit 3b. The other end of the second pull-down resistor 3e is connected to the grounding line (GND). A predetermined current flows from the output terminal of the second gate driving IC 2b to the grounding line via the second pull-down resistor 3e.

A third pull-down resistor 3f has a predetermined resistance value. One end of the third pull-down resistor 3f is connected to the output terminal DIS of the microcomputer 3a and one input terminal of the AND gate circuit 3b. The other end of the third pull-down resistor 3f is connected to the grounding line (GND). A predetermined current flows from the output terminal DIS of the microcomputer 3a to the grounding line via the third pull-down resistor 3f.

A fourth pull-down resistor 3g has a predetermined resistance value. One end of the fourth pull-down resistor 3g is connected to the output terminal of the OR gate circuit 3c and the other input terminal of the AND gate circuit 3b. The other end of the fourth pull-down resistor 3g is a resistor connected to the grounding line (GND). A predetermined current flows from the output terminal of the OR gate circuit 3c to the grounding line via the fourth pull-down resistor 3g.

Next, operations of a main part of the control device A according to the present embodiment will be described in detail with reference to a flowchart of FIG. 3 and a timing chart of FIG. 4.

Figure 3:
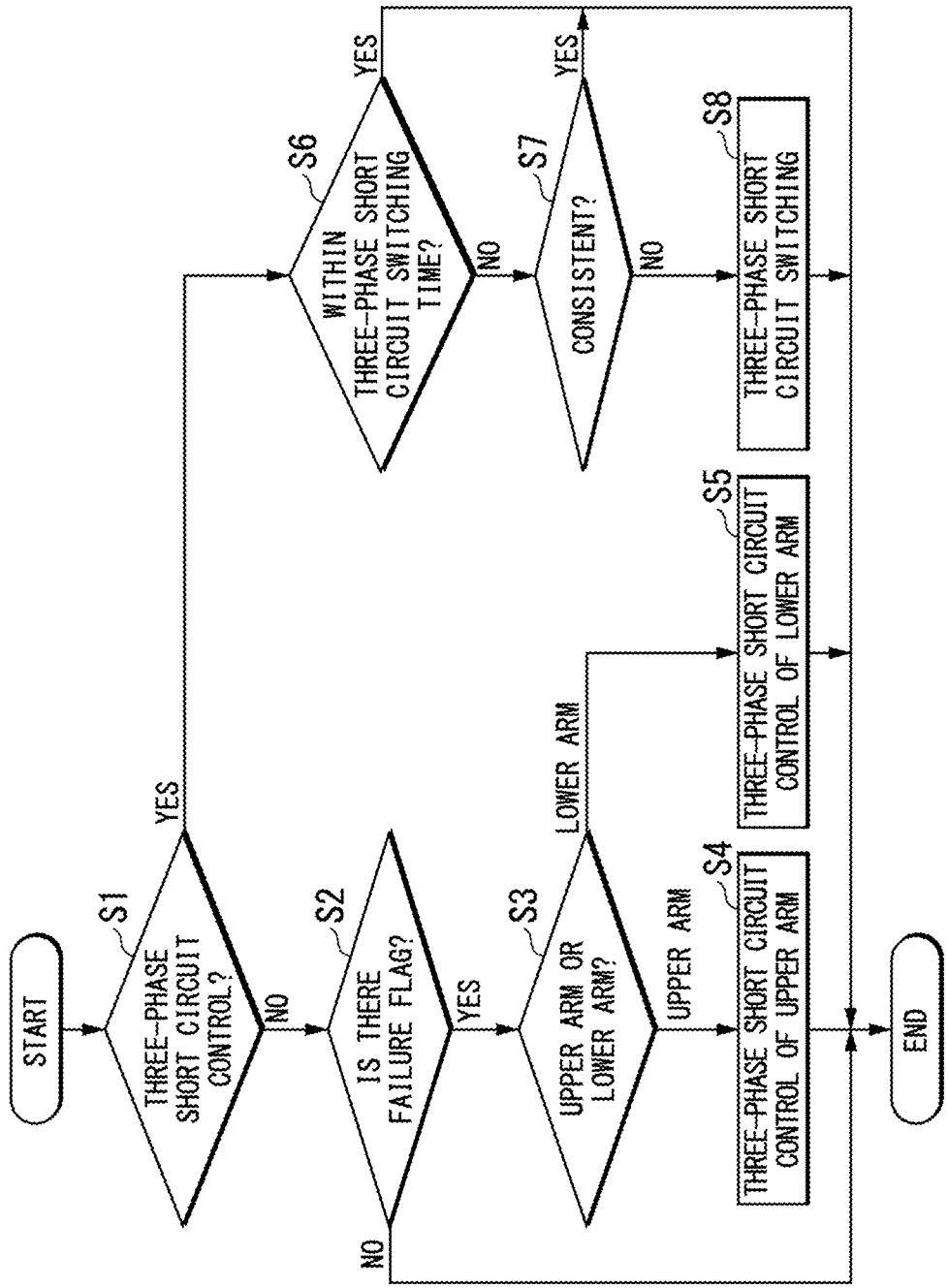
FIG. 3 is a flowchart which shows an operation of the control device A according to the embodiment of the present invention.

The microcomputer 3a of the ECU 3 performs short circuit failure confirmation processing of the first to the sixth driving IGBTs 8a to 8f shown in the flowchart of FIG. 3 in processing of generating normal first to sixth driving gate signals performed at predetermined time intervals, that is, during control of the three-phase motor M. The microcomputer 3a first determines whether three-phase short circuit control of the first to sixth driving IGBTs 8a to 8f is already being executed on the basis of a control program stored therein (step S1).

The microcomputer 3a determines whether a failure flag based on the first detection signal K1 and the second detection signal K2 is set when the determination in step S1 is "No," that is, when the three-phase short circuit control of the first to the sixth driving IGBTs 8a to 8f is not being executed (step S2). This failure flag is a control data setting area set inside the microcomputer 3a, and is formed of a first failure flag corresponding to the first detection signal K1 and a second failure flag corresponding to the second detection signal K2.

The failure flag is set to "0" as control data when the first to the sixth driving IGBTs 8a to 8f are in a normal state, that is, when the first detection signal K1 and the second detection signal K2 remain to have a Hi potential. In addition, the failure flag is set to "1" when the first detection signal K1 and the second detection signal K2 have a Lo potential, that is, when a short circuit failure occurs in the first to the sixth driving IGBTs 8a to 8f.

The first failure flag is set to "1" when the first detection signal K1 has a Lo potential, and the second failure flag is set to "1" when the second detection signal K2 has a Lo potential. The microcomputer 3a determines whether a failure flag is set by confirming whether the first failure flag or the second failure flag is set to "1" in step S2 described above.

When the determination in step S2 is "Yes," the microcomputer 3a executes determination processing of determining whether a short circuit failure has occurred in the first driving IGBT 8a, the third driving IGBT 8b, and the fifth driving IGBT 8e that constitute the upper arm, or the second driving IGBT 8b, the fourth driving IGBT 8d, and the sixth driving IGBT 8f that constitute the lower arm in the first inverter D2 by confirming which of the first failure flag and the second failure flag is set to "1" (step S3).

The microcomputer 3a performs three-phase short circuit control on the three driving IGBTs that constitute the arm in which a short circuit failure has occurred. The microcomputer 3a sets all of the first driving IGBT 8a, the third driving IGBT 8b, and the fifth driving IGBT 8e to be in the ON state when a result of the determination in step S3 is "upper arm," that is, when it is determined which of the first driving IGBT 8a, the third driving IGBT 8b, and the fifth driving IGBT 8e that constitute the upper arm has a short circuit failure (step S4).

On the other hand, the microcomputer 3a sets all of the second driving IGBT 8b, the fourth driving IGBT 8d, and the sixth driving IGBT 8f that constitute the lower arm to be in the ON state when a result of the determination in step S3 is "lower arm," that is, when it is determined that which of the second driving IGBT 8b, the fourth driving IGBT 8d, and the sixth driving IGBT 8f that constitute the lower arm has a short circuit failure (step S5).

Time-series operations of a circuit shown in FIG. 2, that is, operations up to execution of the three-phase short circuit control, will be described with reference to a timing chart of FIG. 4. Note that FIG. 4 shows time-series operations of one of the U-phase driving switching leg, the V-phase driving switching leg, and the W-phase driving switching leg, but operations of the other two switching legs are the same as those in FIG. 4.

An electrically driven vehicle mounted with the control device A according to the present embodiment travels by rotationally driving the wheels by the gate driver 2 supplying the first inverter D2 with the first to the sixth gate signals. This electrically driven vehicle generates traveling power by the U-phase driving switching leg, the V-phase driving switching leg, and the W-phase driving switching leg being controlled according to the first to the sixth gate signals.

Figure 4:
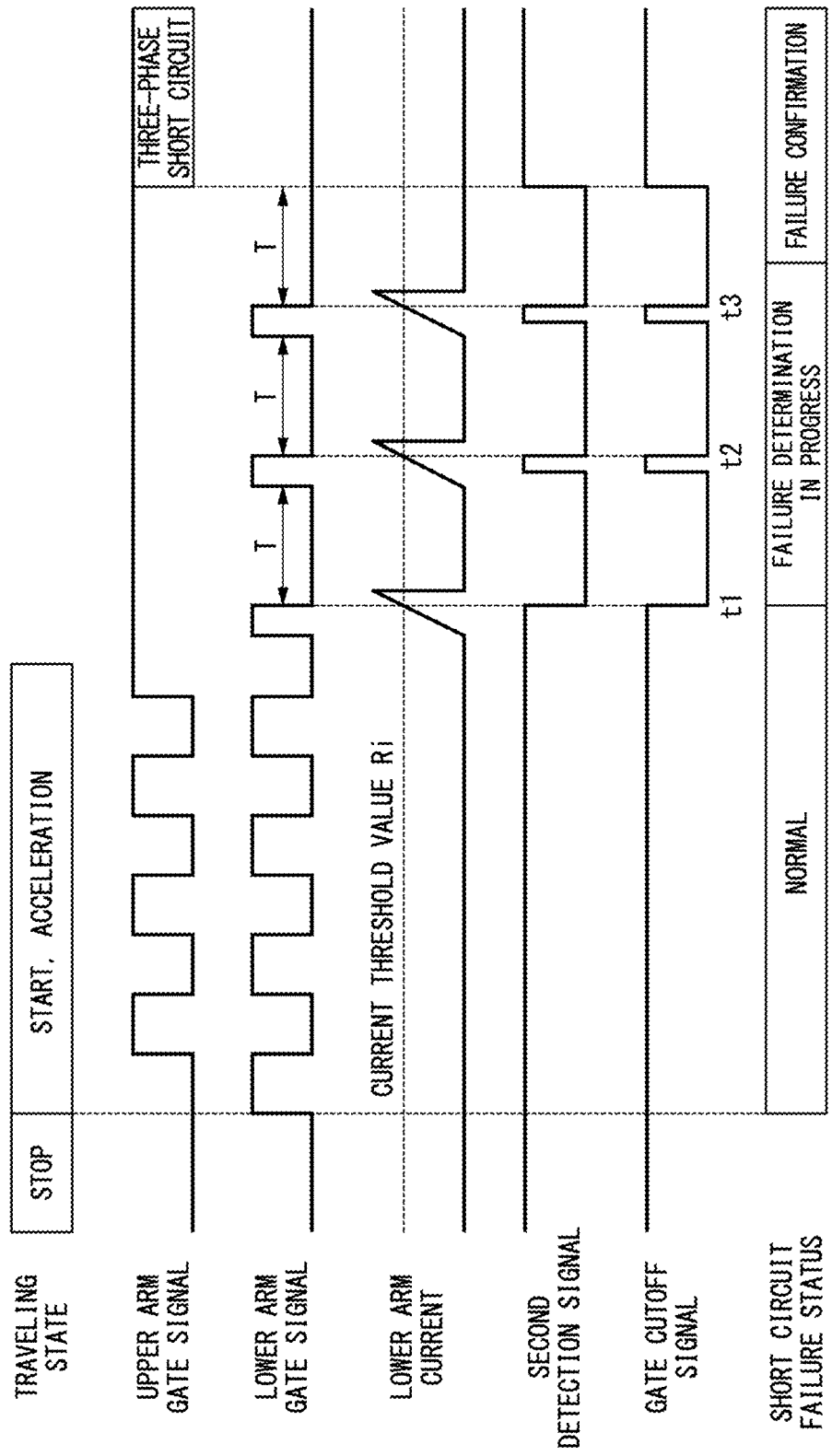
FIG. 4 is a timing chart which shows an operation of the control device A according to the embodiment of the present invention.

When one of the U-phase driving switching leg, the V-phase driving switching leg, and the W-phase driving switching leg is focused, the pair of gate driving ICs 2a and 2b generate the upper arm gate signal L1 and the lower arm gate signal L2 in the electrically driven vehicle, thereby shifting a traveling state from a stop state to a start/acceleration state as shown in FIG. 4.

The upper arm gate signal L1 and the lower arm gate signal L2 are PWM signals having an opposite phase relationship with each other as shown in FIG. 4. The upper arm gate signal L1 and the lower arm gate signal L2 have a PWM signal duty ratio that is variably set according to a voltage command value appropriately input from the microcomputer 3a. Moreover, a dead time for preventing a through current of a switching leg is set in the upper arm gate signal L1 and the lower arm gate signal L2.

In a state where the upper arm gate signal L1 and the lower arm gate signal L2 are sequentially generated and the electrically driven vehicle is traveling, for example, when the second gate driving IC 2b detects that a monitor current of the lower arm IGBT 20 has increased to exceed the current threshold value Ri, the second detection signal K2 transits from a Hi (high) potential to a Lo (low) potential.

When the second detection signal K2 is input, the microcomputer 3a starts a timer to measure an elapsed time. The microcomputer 3a causes a cutoff control signal N to transit from a Lo (low) potential to a Hi (high) potential when a predetermined time threshold value T elapses. When this cutoff control signal N is input to the OR gate circuit 3c, the gate cutoff signal J shown in FIG. 4 has a Hi (high) potential. Regardless of a state of the first detection signal K1 and the second detection signal K2, it is possible to control the upper arm gate signal L1 and the lower arm gate signal L2 according to an output logic instructed by the microcomputer 3a.

When either the first detection signal K1 or the second detection signal K2 has a Lo (low) potential while the cutoff control signal N has a Lo (low) potential, the gate cutoff signal J has a Lo (low) potential. When the gate cutoff signal J has a Lo (low) potential, the upper arm gate signal L1 and the lower arm gate signal L2 are forcibly set to have a Lo (low) potential.

The microcomputer 3a executes the three-phase short circuit control when the transit of the second detection signal K2 from a Hi (high) potential to a Lo (low) potential occurs three times. That is, the microcomputer 3a executes the three-phase short circuit control when the second gate driving IC 2b detects an overcurrent that exceeds the current threshold value Ri three times on the basis of the monitor current of the lower arm IGBT 20.

In the time-series operations up to the execution of the three-phase short circuit control, a short circuit failure status in the microcomputer 3a shifts from "normal" to "failure determination in progress" at a time t1 at which the second detection signal K2 first has transited from a Hi (high) potential to a Lo (low) potential as shown at the bottom of FIG. 4. Then, the short circuit failure status shifts to "failure confirmation" when a time t2 at which the second detection signal K2 has transited from a Hi (high) potential to a Lo (low) potential for the second time is elapsed, and a time t3 at which the second detection signal K2 has transited from a Hi (high) potential to a Lo (low) potential for the third time is elapsed.

On the other hand, the microcomputer 3a determines whether it is within a three-phase switching time when the determination in step S1 is "Yes," that is, during three-phase short circuit control (step S6). The determination in step S6 is set to "No" when an elapsed time since a start of the three-phase short circuit control does not exceed a predetermined time threshold value, and the determination in step S6 is set to "Yes" when the elapsed time exceeds the predetermined time threshold value.

When the determination in step S6 is "No," the microcomputer 3a determines whether the three-phase short circuit control being executed is consistent with the determination in step S3 (step S7). The microcomputer 3a performs three-phase short circuit switching when the determination in step S7 is "No," that is, when the three-phase short circuit control being executed is inconsistent with the determination in step S3 (step S8).

When the three-phase short circuit control being executed is performed on the second driving IGBT 8b, the fourth driving IGBT 8d, and the sixth driving IGBT 8f that constitute the lower arm and a result of the determination in step S3 is "upper arm," the microcomputer 3a performs the three-phase short circuit control on the first driving IGBT 8a, the third driving IGBT 8c, and the fifth driving IGBT 8e that constitute the upper arm instead of the second driving IGBT 8b, the fourth driving IGBT 8d, and the sixth driving IGBT 8f that constitute the lower arm.

When the three-phase short circuit control being executed is performed on the first driving IGBT 8a, the third driving IGBT 8c, and the fifth driving IGBT 8e that constitute the upper arm and a result of the determination in step S3 is "lower arm," the microcomputer 3a performs the three-phase short circuit control on the second driving IGBT 8b, the fourth driving IGBT 8d, and the sixth driving IGBT 8f that constitute the lower arm instead of the first driving IGBT 8a, the third driving IGBT 8c, and the fifth driving IGBT 8e that constitute the upper arm.

According to the present embodiment, the microcomputer 3a can determine the arm (the upper arm or the lower arm) in which a short circuit failure has occurred only by confirming a set value of the first failure flag and a set value of the second failure flag. For this reason, according to the present embodiment, it is possible to provide a control device A that does not require arithmetic processing of a phase current.

In addition, according to the present embodiment, since the pair of gate driving ICs 2a and 2b (switch short circuit detection units) detect a short circuit failure during control (during operation) of the three-phase motor M (motor), three-phase short circuit control can be promptly executed when a short circuit failure occurs. For this reason, according to the present embodiment, it is possible to accelerate an execution timing of the three-phase short circuit control.

Moreover, according to the present embodiment, when the microcomputer 3a of the ECU 3 has already executed the three-phase short circuit control, it determines whether an elapsed time from the execution of the three-phase short circuit control is within a predetermined time threshold value. When the elapsed time from the execution of the three-phase short circuit control is within the time threshold value, the microcomputer 3a determines whether an arm on which the three-phase short circuit control is executed matches a short circuit polarity. The microcomputer 3a switches a target arm of the three-phase short circuit control when the arm on which the three-phase short circuit control is executed does not match the short circuit polarity. According to the present embodiment, it is possible to realize more accurate three-phase short circuit control.

Furthermore, according to the present embodiment, since the first detection signal and the second detection signal of the pair of gate driving ICs 2a and 2b (switch short circuit detection units) are aggregated for each upper arm and each lower arm and supplied to the microcomputer 3a of the ECU 3, it is possible to reduce the number of input ports in the microcomputer 3a. When not aggregated, a total of 6 input ports will be required, but a total of 2 input ports can be used by aggregating the detection signals for each upper arm and each lower arm.

The present invention is not limited to the embodiment described above, and, for example, the following modifications can be considered.
(1) In the embodiment described above, the determination of a short circuit polarity in the U-phase driving switching leg, the V-phase driving switching leg, and the W-phase driving switching leg that constitute the first inverter D2 has been described, but the present invention is not limited thereto. The present invention can be applied not only to a three-phase motor, that is, a motor whose number of phases is three, but can be also applied to a motor whose number of phases is other than three. Furthermore, the motor in the present invention is not limited to one that drives the wheels.
(2) In the embodiment described above, the processing of determining a short circuit polarity is performed in the pair of gate driving ICs 2a and 2b, but the present invention is not limited thereto. The short circuit polarity may be determined in an electronic circuit provided separately from the pair of gate driving ICs 2a and 2b.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

A Control device
D1 Bidirectional step-up/down converter
D2 First inverter
D3 Second inverter
E1, E2 Battery terminal
Fu, Fv, Fw Motor terminal
G Generator
Hu, Hv, Hw Generator terminal
J Gate cutoff signal
K1, K2 Detection signal
L1, L2 Gate signal
M Three-phase motor (Motor)
N Cutoff control signal
P Battery
1 PCU (Power control unit)
2 Gate driver (Control unit)
2a, 2b Gate driving IC (Switch short circuit detection unit)
2c, 2d Insulated power supply circuit
2e Pull-down resistor
3 ECU (Control unit)
3a Microcomputer
3b AND gate circuit
3c OR gate circuit
3d to 3g Pull-down resistor
4 First capacitor
5 Transformer
5a Primary winding
5b Secondary winding
6a to 6d Transformer IGBT
8a to 8f Driving IGBT (Semiconductor switching element)
9a to 9f Power generation IGBT
10 Upper arm IGBT (Semiconductor switching element)
20 Lower arm IGBT (Semiconductor switching element)

What is claimed is:

1. A control device in which a plurality of switching legs including a pair of semiconductor switching elements constituting an upper arm and a lower arm are provided in a number corresponding to the number of phases of a motor that is a load, the control device comprising:
   a switch short circuit detection unit configured to monitor a state of a current flowing to a semiconductor switching element of the pair of the semiconductor switching elements and detect a short circuit failure of a remaining semiconductor switching element of the pair of the semiconductor switching elements; and
   a control unit configured to execute determination processing of determining whether the short circuit failure has occurred in the upper arm or the lower arm as a short circuit polarity on the basis of a result of detection by the switch short circuit detection unit, and to set all the semiconductor switching elements that constitute an arm in which the short circuit failure has occurred on the basis of a result of the determination processing to be in an ON state,
   wherein, when all the semiconductor switching elements are already set to be in an ON state, the control unit determines whether an elapsed time since all the elements were set to be in the ON state is within a predetermined time threshold value, determines whether an arm whose semiconductor switching elements are all set to be in the ON state matches a result of the determination processing when the elapsed time is within the time threshold value, and switches the arm whose semiconductor switching elements are all set to be in the ON state when the arm does not match the result of the determination processing.

2. The control device according to claim 1, wherein the switch short circuit detection unit is provided for each of the pair of the semiconductor switching elements,
   the switch short circuit detection unit is configured to monitor a state of a current flowing to the semiconductor switching element of the pair of the semiconductor switching elements corresponding to the switch short circuit detection unit and detects the short circuit failure of the remaining semiconductor switching element of the pair of the semiconductor switching elements corresponding to the switch short circuit detection unit.

3. The control device according to claim 1, wherein the control unit executes the determination processing while the motor is controlled, and sets all the semiconductor switching elements constituting an arm in which the short circuit failure has occurred on the basis of a result of the determination processing to be in an ON state.

4. The control device according to claim 2, wherein the control unit executes the determination processing while the motor is controlled, and sets all the semiconductor switching elements constituting an arm in which the short circuit failure has occurred on the basis of a result of the determination processing to be in an ON state.

5. The control device according to claim 1, wherein detection results of the short circuit failure in each phase are aggregated into one signal each for the upper arm and the lower arm and supplied to the control unit.

6. The control device according to claim 2, wherein detection results of the short circuit failure in each phase are aggregated into one signal each for the upper arm and the lower arm and supplied to the control unit.

7. The control device according to claim 3, wherein detection results of the short circuit failure in each phase are aggregated into one signal each for the upper arm and the lower arm and supplied to the control unit.

8. The control device according to claim 4, wherein detection results of the short circuit failure in each phase are aggregated into one signal each for the upper arm and the lower arm and supplied to the control unit.

9. The control device according to claim 1,
   wherein the semiconductor switching element of the pair of the semiconductor switching elements includes a current monitor terminal, and
   the switch short circuit detection unit monitors whether or not a current flowing to the remaining semiconductor switching element of the pair of the semiconductor switching elements is overcurrent, on the basis of a current input from the current monitor terminal.

10. The control device according to claim 2,
   wherein the semiconductor switching element of the pair of the semiconductor switching elements includes a current monitor terminal, and
   the switch short circuit detection unit monitors whether or not a current flowing to the remaining semiconductor switching element of the pair of the semiconductor switching elements is overcurrent, on the basis of a current input from the current monitor terminal.

11. The control device according to claim 3,
wherein the semiconductor switching element of the pair of the semiconductor switching elements includes a current monitor terminal, and
the switch short circuit detection unit monitors whether or not a current flowing to the remaining semiconductor switching element of the pair of the semiconductor switching elements is overcurrent, on the basis of a current input from the current monitor terminal.

12. The control device according to claim 4,
wherein the semiconductor switching element of the pair of the semiconductor switching elements includes a current monitor terminal, and
the switch short circuit detection unit monitors whether or not a current flowing to the remaining semiconductor switching element of the pair of the semiconductor switching elements is overcurrent, on the basis of a current input from the current monitor terminal.

13. A control device in which a plurality of switching legs including a pair of semiconductor switching elements constituting an upper arm and a lower arm are provided in a number corresponding to the number of phases of a motor that is a load, the control device comprising:
a switch short circuit detection unit configured to detect a short circuit failure of a semiconductor switching element of the pair of the semiconductor switching elements; and
a control unit configured to determine whether the short circuit failure has occurred in the upper arm or the lower arm as a short circuit polarity on the basis of a result of detection by the switch short circuit detection unit, and to set all the semiconductor switching elements that constitute an arm in which the short circuit failure has occurred on the basis of a result of the determination processing to be in an ON state, wherein
the semiconductor switching elements include a current monitor terminal,
each of the semiconductor switching elements includes the switch short circuit detection unit,
the switch short circuit detection unit corresponding to each of the semiconductor switching elements of the upper arm monitors whether or not a current flowing to the corresponding semiconductor switching element is overcurrent, on the basis of a current input from the current monitor terminal of the corresponding semiconductor switching element,
in a case in which a current flowing to the corresponding semiconductor switching element is overcurrent, the switch short circuit detection unit corresponding to each of the semiconductor switching elements of the upper arm detects a short circuit failure of the semiconductor switching element of the lower arm which forms a pair with the corresponding semiconductor switching element,
the switch short circuit detection unit corresponding to each of the semiconductor switching elements of the lower arm monitors whether or not a current flowing to the corresponding semiconductor switching element is overcurrent, on the basis of a current input from the current monitor terminal of the corresponding semiconductor switching element, and
in a case in which a current flowing to the corresponding semiconductor switching element is overcurrent, the switch short circuit detection unit corresponding to each of the semiconductor switching elements of the lower arm detects a short circuit failure of the semiconductor switching element of the upper arm which forms a pair with the corresponding semiconductor switching element,
wherein, when all the semiconductor switching elements are already set to be in an ON state, the control unit determines whether an elapsed time since all the elements were set to be in the ON state is within a predetermined time threshold value, determines whether an arm whose semiconductor switching elements are all set to be in the ON state matches a result of the determination processing when the elapsed time is within the time threshold value, and switches the arm whose semiconductor switching elements are all set to be in the ON state when the arm does not match the result of the determination processing.

14. The control device according to claim 13, wherein the control unit executes the determination processing while the motor is controlled and sets all the semiconductor switching elements constituting an arm in which the short circuit failure has occurred on the basis of a result of the determination processing to be in an ON state.

* * * * *